(12) United States Patent
Sevgen et al.

(10) Patent No.: US 12,446,600 B2
(45) Date of Patent: Oct. 21, 2025

(54) TWO-STAGE SAMPLING FOR ACCELERATED DEFORMULATION GENERATION

(71) Applicant: Citrine Informatics, Inc., Redwood City, CA (US)

(72) Inventors: Selami Emre Sevgen, Chicago, IL (US); Brendan David Folie, San Francisco, CA (US); Julia Black Ling, Redwood City, CA (US)

(73) Assignee: Citrine Informatics, Inc., Redwood City, CA (US)

( * ) Notice: Subject to any disclaimer, the term of this patent is extended or adjusted under 35 U.S.C. 154(b) by 948 days.

(21) Appl. No.: 17/578,759

(22) Filed: Jan. 19, 2022

(65) Prior Publication Data

US 2022/0232863 A1 Jul. 28, 2022

Related U.S. Application Data

(60) Provisional application No. 63/141,723, filed on Jan. 26, 2021.

(51) Int. Cl.
*A23L 5/00* (2016.01)
*G06F 18/214* (2023.01)
(Continued)

(52) U.S. Cl.
CPC ............ *A23L 5/00* (2016.08); *G06F 18/2155* (2023.01); *G06F 18/2415* (2023.01); *G06N 3/08* (2013.01)

(58) Field of Classification Search
CPC ... A23L 5/00; G06F 18/2155; G06F 18/2415; G06N 3/08
See application file for complete search history.

(56) References Cited

U.S. PATENT DOCUMENTS 10,741,185 B2 * 8/2020 Gruber ............... G06F 16/2457
2009/0028968 A1 1/2009 Tam et al.

FOREIGN PATENT DOCUMENTS

CA 2447047 A1 11/2002

OTHER PUBLICATIONS

Testud, JC, "Food Ingredient Reverse-Engineering Through Gradient Descent", Towards Data Science, Insight Media Group LLC, Dec. 20, 2017, https://towardsdatascience.com/food-ingredient-reverse-engineering-through-gradient-descent-2a8d3880dd81 (Year: 2017).*

(Continued)

*Primary Examiner* — Miranda M Huang
*Assistant Examiner* — Victor Adelard Nault
(74) *Attorney, Agent, or Firm* — Fenwick & West LLP

(57) ABSTRACT

A device receives an ingredient list having a sequence of ingredients ordered by relative amount, and generates formulation vectors by sampling the ingredients list. The device inputs the plurality of formulation vectors into a machine-learned model, the machine-learned model generating an encoded version of each of the plurality of formulation vectors using an encoder, and then outputting a plurality of reconstructed formulation vectors as derived using a decoder. The device identifies reconstructed formulation vectors that have an order that matches the sequence, defines a latent space using the encoded version of the matching reconstructed formulation vectors. The device iteratively samples the latent space until a threshold number of samples are derived that match an ordering constraint that corresponds to the sequence, performs a statistical aggregation of the samples, and outputs an indication of an absolute amount of each ingredient in the ingredients list.

18 Claims, 6 Drawing Sheets

(51) Int. Cl.
*G06F 18/2415* (2023.01)
*G06N 3/08* (2023.01)

(56) References Cited

OTHER PUBLICATIONS

Meredig, Bryce et al. "Combinatorial screening for new materials in unconstrained composition space with machine learning." Physical Review B 89 (2014): 094104. (Year: 2014).*
Engel, Jesse et al. "Latent Constraints: Learning to Generate Conditionally from Unconditional Generative Models." ArXiv abs/1711.05772 (2017): n. pag. (Year: 2017).*
Salvador, Amaia et al. "Recipe1M: A Dataset for Learning Cross-Modal Embeddings for Cooking Recipes and Food Images." ArXiv abs/1810.06553 (2018): n. pag. (Year: 2018).*
Dai, Bin and David Paul Wipf. "Diagnosing and Enhancing VAE Models." ArXiv abs/1903.05789 (2019): n. pag. (Year: 2019).*
PCT International Search Report and Written Opinion, PCT Application No. PCT/US22/12888, Apr. 27, 2022, 15 pages.
Renishaw PLC—Spectroscopy, "Using Raman Imaging for Deformulating Drugs," Jan. 22, 2020, pp. 1-13, [Online] [Retrieved on Apr. 7, 2022] Retrieved from the Internet <URL: https://www.azom.com/article.aspx?ArticleID=1888>.
Marin, Javier et al., "RecipeIM+: A Dataset 1,2,6-10 for Learning Cross-Modal Embeddings for Cooking Recipes and Food Images," IEEE Transactions on Pattern Analysis and Machine Intelligence, IEEE Computer Society, USA, pp. 3020-3028.
European Patent Office, Extended European Search Report and Opinion, EP Patent Application No. EP 22746405.4, Nov. 27, 2024, 11 pages.

\* cited by examiner

TWO-STAGE SAMPLING FOR ACCELERATED DEFORMULATION GENERATION

CROSS REFERENCE TO RELATED APPLICATIONS

This application claims the benefit of U.S. Provisional Application No. 63/141,723, filed Jan. 26, 2021, the disclosure of which is hereby incorporated by reference herein in its entirety.

TECHNICAL FIELD

The disclosure generally relates to the field of machine learning, and more particularly relates deformulating an ingredients list using single-stage or multi-stage machine learning.

BACKGROUND

In many consumer goods (e.g. cosmetics, hair care), the ingredients list is common knowledge, as is the fact that ingredients are listed in order from most to least prevalent, but the exact amounts of various ingredients are unknown by competitive companies. Reverse engineering chemical compounds is difficult or impossible using chemistry techniques. Existing techniques for performing "deformulation" (that is, reverse-engineering ingredient amounts based on an ordered ingredients list) that are non-chemical in nature are extremely inefficient and wind up with waste and low accuracy.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
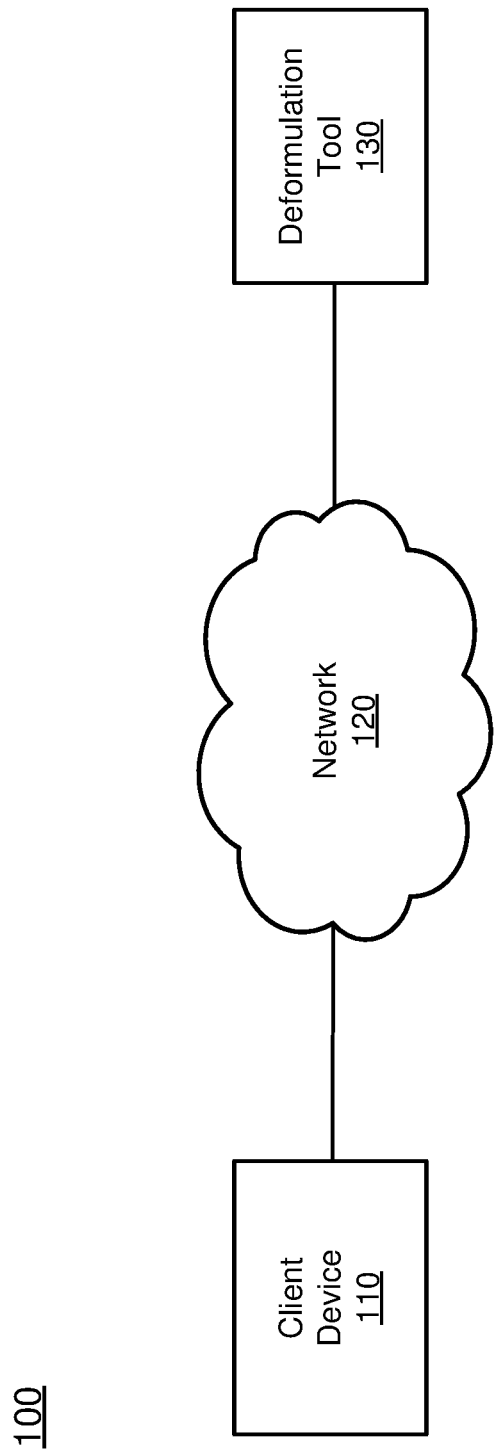
FIG. 1 illustrates one embodiment of an environment for interfacing a client device with a deformulation tool.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Systems and methods are disclosed herein to deformulate ingredient lists by using machine learning (e.g., variational auto-encoders (VAEs)) along with a variety of sampling techniques (e.g., one-stage sampling and two-stage sampling techniques) to construct the deformulated ingredient amounts. As will become evident through the following disclosure, the two-stage sampling approach represents a more efficient method for deformulation than would be possible with single-stage sampling because it leverages the structure within the VAE latent space to find promising samples more efficiently than random sampling in the original formulation vector space, thus reducing processing power and computational resources that would otherwise be necessary to perform deformulation.

In an embodiment, a deformulation tool receives an ingredient list including a sequence of ingredients, the sequence establishing a relative amount of each ingredient based on where each ingredient falls within the sequence. The deformulation tool generates a plurality of formulation vectors, each formulation vector derived by performing a random sampling of the ingredients list that indicates a relative share of known candidate ingredients that may be present in the ingredient list. The deformulation tool inputs the plurality of formulation vectors into a machine-learned model, the machine-learned model generating an encoded version of each of the plurality of formulation vectors using an encoder, and then outputting a plurality of reconstructed formulation vectors as derived using a decoder.

The deformulation tool identifies a subset of the plurality of reconstructed formulation vectors that have an order that matches the sequence, and defines a latent space using the encoded version of the subset of reconstructed formulation vectors. The deformulation tool iteratively samples the latent space until a threshold number of samples are derived that match an ordering constraint that corresponds to the sequence, performs a statistical aggregation of the samples, and outputs an indication of an absolute amount of each ingredient in the ingredients list.

Deformulation Tool Functionality

FIG. 1 illustrates one embodiment of an environment for interfacing a client device with a deformulation tool. FIG. 1 includes client device 110, network 120, and deformulation tool 130. Client device 110 may be operated by any user wishing to deformulate a recipe. For example, a user using inputs a recipe having an ordered ingredients list into a user interface (e.g., as discussed below with respect to FIG. 6), and those parameters are transmitted over network 120 (which may be any network, such as the Internet) to deformulation tool 130, which may deformulate the recipe using the systems and methods disclosed below with respect to FIGS. 2-5. In an embodiment, deformulation tool 130 operates partially or fully as a module of client device 110 (e.g., as a downloaded application).

Network 120 may be any network, such as the Internet, a wide area network, a local area network, a cellular network, or any other means of data communication through which a recipe may be transmitted from client device 110, and a deformulated ingredient list may be transmitted from deformulation tool 130.

Deformulation tool 130 uses machine learning techniques to deformulate the recipe provided by client device 110. These techniques are discussed in further detail below with respect to FIGS. 2-4. After the recipe is deformulated, deformulation tool 130 transmits the deformulated recipe to client device 110 (e.g., using network 120).

Figure 2:
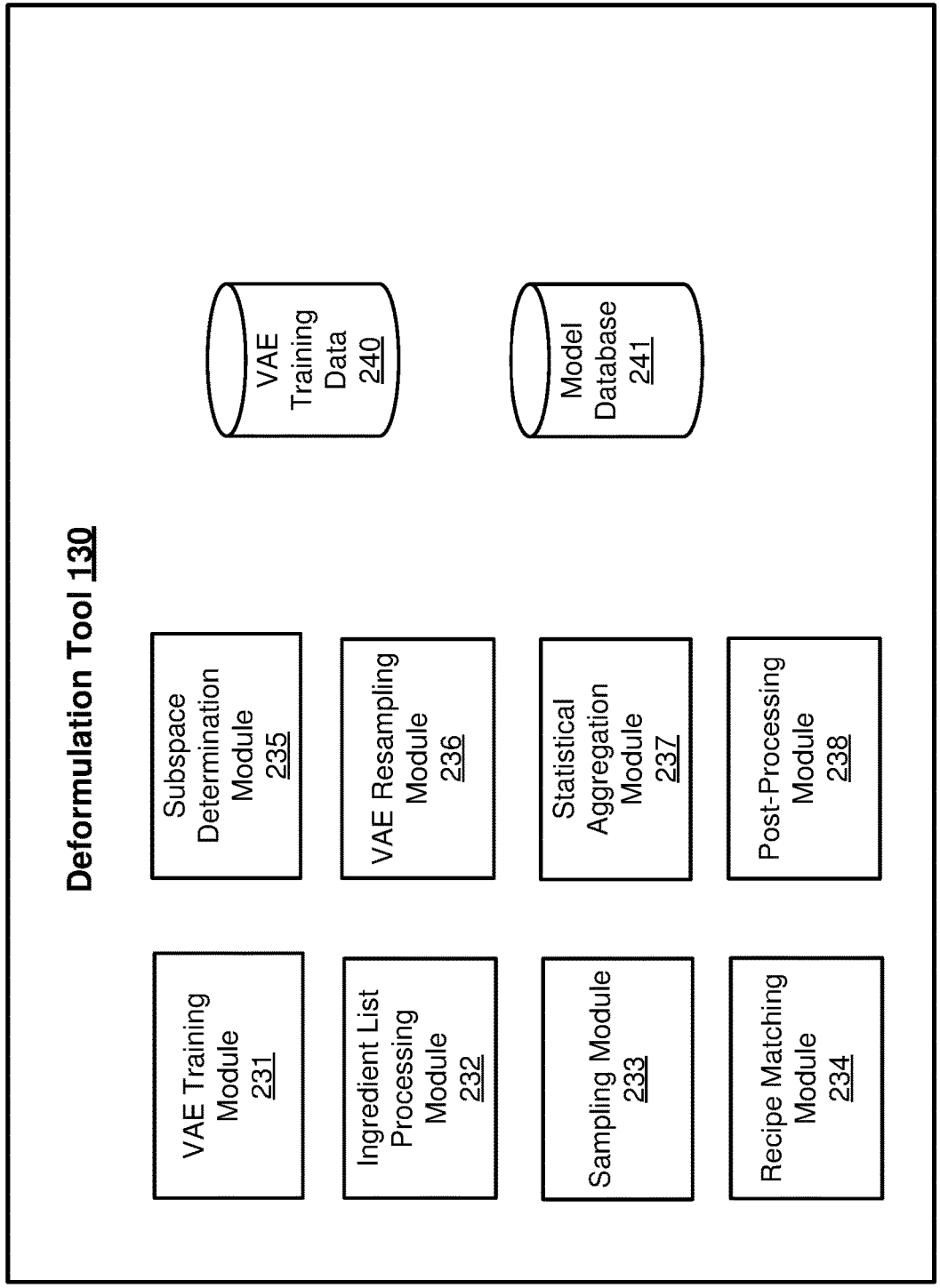
FIG. 2 illustrates one embodiment of exemplary modules and databases of the deformulation tool.

FIG. 2 illustrates one embodiment of exemplary modules and databases of the deformulation tool. As depicted in FIG. 2, deformulation tool 130 includes VAE training module 231, ingredient list processing module 232, sampling module 233, recipe matching module 234, subspace determination module 235, VAE resampling module 236, statistical aggregation module 237, and post-processing module 238, as well as VAE training data 240 and model database 241. The modules and databases depicted in FIG. 2 are merely exemplary; fewer or more modules may be used to achieve the functionality described herein. Moreover, the modules and databases need not be in a single location, and may be distributed across environment 100 and intercommunicate using network 120.

VAE training module 231 obtains training data from one or more databases (e.g., VAE training data 240). VAE training data 240, while depicted as part of deformulation tool 130, may be partially or wholly located outside of deformulation tool 130 (e.g., third-party databases or distributed between deformulation tool 130 and across one or more third-party databases). The training data may include known formulation recipes as labeled by a composition yielded by the given formulation recipe. Formulation recipes specify the amount of each ingredient that is present in the formulation. In an embodiment, the formulation recipes may include additional information, such as formulation properties and formulation processing information. The composition label may be generic and/or specific (e.g., "shampoo" is a generic label, "dandruff shampoo" is more specific, and "[brand name] [product name] shampoo" is even more specific.

In an embodiment, VAE training module 231 constructs an M×N matrix using at least a portion of the training data. In such an embodiment, M is defined as the number of formulation ingredients across the training data, N is the amount of rows in the matrix, and each formulation ingredient of each training data example populates its respective row of data, thus yielding a full training dataset of dimension M by N.

Following the obtaining of training data, the VAE training module 231 creates and trains a VAE. A VAE has two halves: an encoder and a decoder. VAE training module 231 inputs formulation vectors (e.g., individually, or as part of the matrix) into the encoder. A formulation vector is a representation of what ingredients are, and are not, part of a given formulation. For example, a formulation vector for a formulation having five ingredients may include values representative of the amounts of each of those five ingredients, and may include null values for other ingredients that are part of the training data. The encoder projects each formulation vector (e.g., each row of the matrix) onto a lower dimensional latent space (dimension d). VAE training module 231 inputs the latent space projection into the decoder, which in turn reconstructs, as faithfully as possible, the input formulation and outputs the reconstruction.

The encoder is trained to take as input a formulation vector (e.g., a vector of dimension M) and to output therefrom a latent space vector (e.g., a vector of dimension d). The decoder is trained to take as input the latent space vector (e.g., vector of dimension d), and to output a reconstructed formulation vector (e.g., a vector of dimension M).

The VAE may have any number of layers in the encoder or decoder layer. In one embodiment, the VAE may have 3 encoder layers and 3 decoder layers, all densely connected. The latent space of the VAE may have any number of dimensions less than the full number of ingredients; in one embodiment, there may be M=1000 ingredients of interest and the latent space may have a dimension of d=6. In an embodiment, the final layer of the decoder may include a softmax activation function, which may be used to ensure that the ingredient fractions add up to 100%. VAE training module 231 trains the VAE on the training data (e.g., the matrix) to reconstruct the training data as accurately as possible. VAE training module 231 may store one or more trained VAEs in model database 241.

Ingredient list processing module 232 receives as input an ordered list (that is, from most to least prevalent) of ingredients, without associated ingredient fractions, e.g. Water, NaCl, KCl. Ingredient list processing module 232 determines that the ordering is from highest fractional amount to lowest fractional amount. In the example above, there is more water in the formulation than NaCl, and more NaCl in the formulation than KCl, based on the order in which the list is received. Ingredient list processing module 232 may receive the list from manual input into a user interface (e.g., with a user typing or verbally speaking the ingredients), or may receive the list based on a user input of a product having a publicly available ingredients list. For example, ingredient list processing module 232 may receive an identifier of a given bottle of shampoo (e.g., based on a user scanning a bar code or QR code of the product using an application of deformulation tool 130), and may responsively search one or more databases for the ingredient list corresponding to that product.

Sampling module 233 generates random samples from formulation space. In an embodiment, to generate a random sample, sampling module 233 assigns randomized shares to ingredients that appear in the received ingredient list. Sampling module 233 may assign shares of zero to candidate ingredients that are known to the system, but are not part of the received ingredient list. In an embodiment, the random samples are generated by sampling from a Dirichlet distribution so that all the ingredient fractions sum to 1. Sampling module 233 may generate any number of random samples. In one embodiment, 10,000 initial random samples are generated. The amount of random samples may be prescribed by an administrator, or may be random or randomized itself within a prescribed range of samples. In an optional embodiment, the samples are not truly random, but are instead random within the constraint of ensuring that the shares assigned to each given ingredient map to an order mandated by the ingredient list. For example, where the ingredient list is Water, NaCl, and KCl, a constraint may be applied where random shares must follow a rule where more shares are applied to Water over NaCl, and more shares are applied to NaCl over KCl.

Sampling module 233 may generate reconstructed formulation vectors using the random samples. In an embodiment, sampling module 233 inputs each of the random samples through a trained VAE, and each random sample gets processed by first the encoder, and then the decoder, of the trained VAE. When each random sample is processed by the encoder, encoded versions of the vectors are optionally saved for further processing in a 2-stage embodiment described below. Sampling module 233 receives as output from the trained VAE (e.g., from the decoder) a reconstructed formulation vector for each of the random samples.

Recipe matching module 234 identifies, from the reconstructed formulations vectors, vectors that match the ingredient order list. To do so, recipe matching module 234 compares the reconstructed formulation vectors to the ingredient order list. Specifically, the recipe matching module 234 compares each reconstructed formulation vector's ingredient orderings to the initially input target order. Recipe matching module 234 determines a subset of the reconstructed formulation vectors that match the initially input target order exactly. Recipe matching module 234 determines whether the number of reconstructed formulation vectors in the subset meets a threshold. The threshold may be set by an administrator, may be a default (e.g., a default of one, where the determination is satisfied if any match), or may be determined according to a heuristic. Responsive to determining that the threshold is not met, recipe matching module 234 relaxes one or more constraints requiring an exact match of the order.

The manner in which constraints may be relaxed may be specified by an administrator or by a heuristic. In an exemplary embodiment, in relaxing the one or more constraints, recipe matching module 234 may first determine whether there is a threshold number of matches when ignoring the smallest ingredient (i.e. the first M-1 largest ingredients, where M is the number of ingredients). If none are found, the system may further relax the constraint to M-2, then to M-3, and so on until the threshold number of matches is satisfied. Any other constraint may be determined to be relaxed when iteratively pursuing a match. For example, rather than relaxing from M-1 to M-2 and so on, recipe matching module 234 may relax M-1, then M-2 with M-1, then M-3, then M-3 with M-1, and so on, based on a programmed heuristic.

The term 1-stage sampling, as used herein, refers to an embodiment where only one set of reconstructed formulation vectors are identified and put through a recipe matching module 234. In an embodiment where 1-stage sampling is used, where only one reconstructed formulation vector matches, recipe matching module 234 may determine that the matching reconstructed formulation vector represents a deformulated list of ingredients. Where more than one match is found, recipe matching module 234 may perform a statistical operation across the matches (e.g., an average over the matching vectors, or any other statistical operation), and may use the result of the statistical operation to represent the deformulated list of ingredients.

While one-stage sampling directly (e.g., as done directly from formulation space, as performed by sampling module 233 and recipe matching module 234) can be computationally inefficient in scenarios where very few reconstructed formulation vectors match the correct ingredient order. Such scenarios result in wasteful use of large amounts of computing power in iteratively relaxing constraints and re-analyzing huge amounts of reconstructed formulation vectors until a match is found.

In some embodiments where further computational efficiency is desired, a 2-stage sampling system is employed. The term 2-stage sampling, as used herein, refers to an embodiment where the latent subspace is sampled and then matching is performed to a lower threshold than would be used for 1-stage sampling, and then a second sampling is performed in a promising subspace of latent space based on the matches. The efficiency gained using the 2-stage sampling system is derived from how many random samples are required for a match of certain quality. For example, using the 1-stage system described above, 20000 random points may be sampled, where the best identified match is M-4 (meaning four ingredients are not matched). This requires huge amounts of processing power to iteratively explore the space after relaxing many constraints. Instead, using the below-described 2-stage sampling system, the system may first sample a smaller number (e.g., 10000) and identify a promising latent area (e.g., a latent area based on a small number of matches, such as a threshold substantially smaller relative to the threshold used in 1-stage sampling). The system may then sample another e.g., 10000 from the promising latent area, where the system is much more likely to find better matches (M-2 for example) for the same or a lower computational cost.

In accordance with a two-stage approach, subspace determination module 235 uses the corresponding latent space encoding to define a latent subspace. That is, subspace determination module 235 inputs the matches into the VAE encoder, but has not yet decoded the latent subspace. For example, as mentioned above with respect to VAE training module 231, the VAE may store the output of the encoder for later use in the two-stage approach, prior to decoding the encoder output.

In an embodiment, subspace determination module 235 defines the latent subspace as the minimum to maximum range in the latent space dimension of all matches in their encoded state. That is, sampling module 233 and recipe matching module 234 may act in the manner as described above, and responsive to detecting a threshold number of matches (e.g., a low threshold, such as one or just a few matches), constraint relaxing concludes (e.g., sooner than would occur if a higher threshold of matches were pursued, such as in a one-stage approach). Subspace determination module 235 then determines the latent subspace based on this small number of matches, using the encoded state of the matching reconstructed formulation vectors. In an embodiment, the minimum and maximum range may be padded by a factor to ensure full coverage (e.g., padded by an extra 0.5 in each direction, or by any number determined by an administrator or by heuristic).

VAE resampling module 236 generates randomized vectors by randomly sampling from the latent subspace (which is a promising latent space likely to yield better matches using less computational power relative to a one-stage approach). In an embodiment, the resampling is performed using the already-encoded vectors saved from the output of the encoder when the reconstructed formulation vectors were generated. In another embodiment, VAE resampling module 236 generates the random samples by uniform sampling from the latent subspace. The latent subspace may be constrained to a narrow region based on the initial matches (e.g., the region of latent subspace from the encoded vectors that correspond to the matching vectors of the lower threshold of the two-stage process), leading to samples that have a higher probability of matching the ordering constraint. These benefits result in dramatic improvements in both the speed and the quality of sample generation.

VAE resampling module 236 then may then pass these samples from the latent subspace through the decoding half of the VAE to generate reconstructed formulation vectors. As before, reconstructed formulation vectors are checked for matches in ordering, using the same progressive relaxation method previously described with respect to recipe matching module 234. VAE resampling module 236 generates samples by searching for matches until a minimum threshold number of matches are identified. The minimum may be defined by an administrator to be X samples (e.g., X=25), or may be defined by a heuristic.

Heightened efficiency is achieved in this process. For example, there are costs in scaling, in that more accuracy requires more sampling and more computation. The two-stage approach is more computationally efficient than the one-stage approach using this second sampling stage for a given accuracy. So, if the system were to hold ingredient match filter threshold constant (say, M-4 of the ingredients must match), it would take many less total samples to hit that, on average, with the two-stage sampling approach than with the one stage sampling approach.

Additionally, sampling from latent space is inherently more computationally efficient than sampling from formulation space as this uses much less memory and less network resources. Thus, sampling in formulation space at first to find a promising space, and then sampling the promising space in latent space, is computationally more efficient even when taking the same number of samples as in a single-stage embodiment.

As an example, deformulation tool 130 may aim to deformulate with an average ingredient match for the first M-4 ingredients for an entire dataset. If deformulation tool 130 attempts deformulation on 10 randomly selected candidates to tune the number of random samples, it may require 100,000 one-stage samples to achieve an accurate result, as compared to 10,000+10,000 two stage samples. Additionally, accuracy can be boosted by having deformulation tool 130 add more second stage samples, so 10,000+ 90,000 for a total of 100,000 again, but this is still less computationally expensive than 100,000 first-stage samples because it is more efficient to sample the 90,000 in latent space than it would be to do so wholly in formulation space, while being much more accurate on average. Other levers on accuracy include a target number of matches, X, as input by a user or administrator, and this functions much the same way—two-step will need less total number of samples to hit a required X than one-step. Ultimately, two-stage is either more accurate for same cost, faster for same accuracy, or a combination and its up to the user to pick the balance.

Whether a one-stage or two-stage approach is used, where more than one match is determined, statistical aggregation module 237 aggregates the matched samples using a statistical operation on the ingredient fractions of the X samples (e.g., to generate one formulation vector). In one embodiment, this statistical aggregation may be done by averaging the ingredient fractions over the X samples, though any statistical operation is within the scope of this disclosure.

In some embodiments, following statistical aggregation, the reconstructed formulation vector may have nonzero ingredient fractions for ingredients that were not on the initial ingredient list. To address this problem, post-processing module 238 may set ingredients that do not appear in the ingredient list to 0.0, and then may renormalize the vector to sum to 1. The resulting formulation vector represents the final deformulation.

Figure 3:
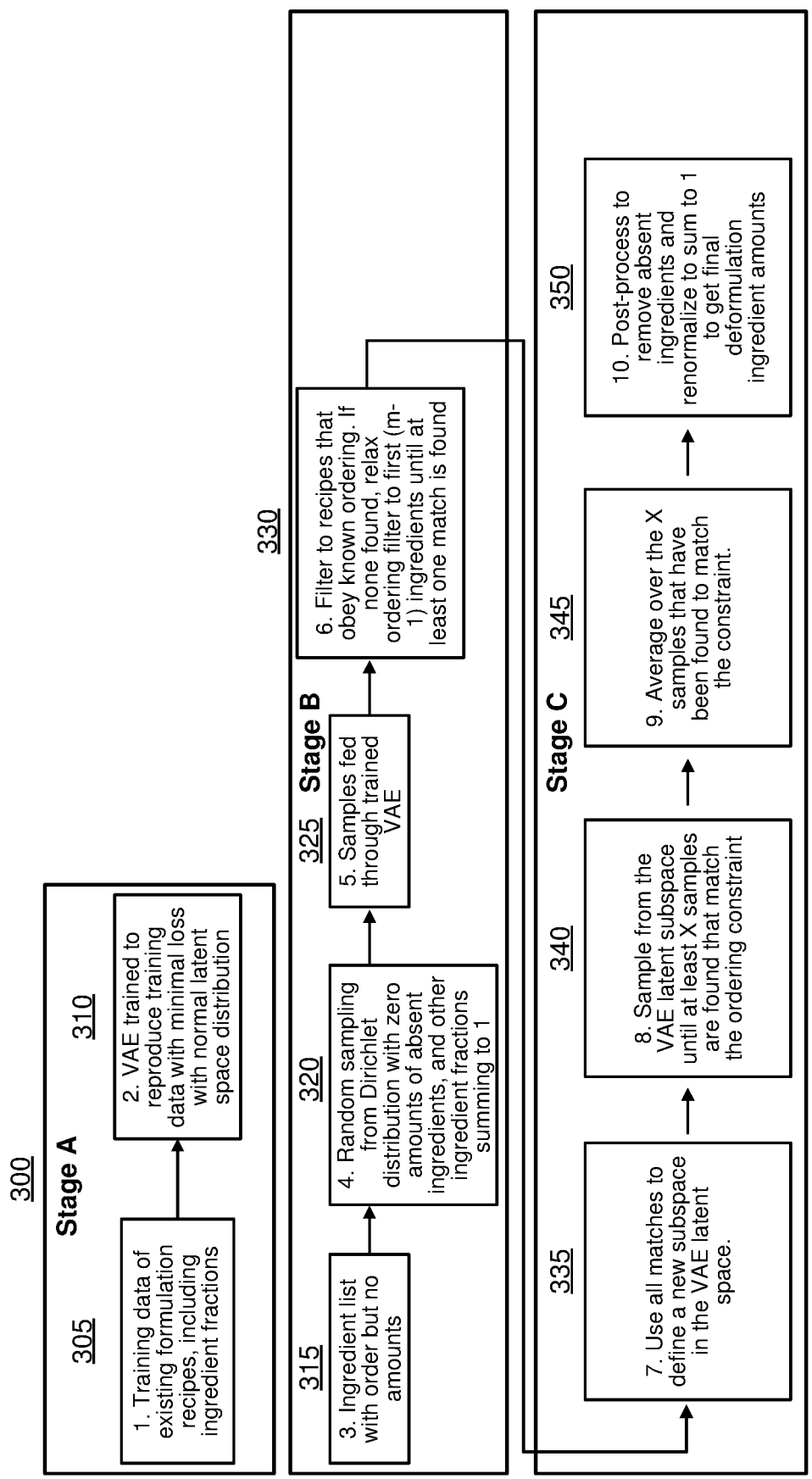
FIG. 3 illustrates an exemplary data flow for deformulating an ingredient list using single-stage or two-stage machine learning.

FIG. 3 illustrates an exemplary data flow for deformulating an ingredient list using single-stage or two-stage machine learning. Data flow 300 focuses on some particular use cases and constraints; however, this is merely for convenience and ease of illustration, and any variation in operation described herein is within the ambit of data flow 300. Data flow 300 begins with a training stage ("Stage A"), during which deformulation tool 130 obtains 305 training data of existing formulation recipes, including ingredient fractions (e.g., from VAE training data 240). Deformulation tool 130 then trains 310 a VAE to reproduce training data with minimal loss with normal latent space distribution (e.g., using VAE training module 231).

Data flow 300 goes on to Stage B, which describes steps unique to a one-stage approach, but that contribute to a two-stage approach if desired. Deformulation tool 130 receives 315 an ingredient list with a defined order, but that omits precise amounts of each given ingredient (e.g., using ingredient list processing module 232). Deformulation tool 130 then performs 320 a random sampling from, e.g., a Dirichlet distribution, using zero to represent amounts of absent ingredients, and ensuring other ingredient fractions sum to 1 (e.g., using sampling module 233). Deformulation tool 130 then feeds 325 the samples through the trained VAE, and filters 330 the samples to recipes that obey known ordering, where if none are found, constraints are relaxed until a threshold number of matches are found (e.g., as performed using recipe matching module 234). In a one-stage approach, the filtered recipe (or recipes as statistically aggregated) would be output as the final deformulation. In a two stage approach, data flow 300 continues to Stage C.

In Stage C, deformulation tool 130 uses 335 the matches to define a new subspace in the VAE latent space (e.g., identification of a promising subspace, as performed by subspace determination module 235). Deformulation tool 130 goes on to sample 340 from the VAE latent subspace until at least a threshold number of samples are found that match the ordering constraint (e.g., a lower threshold used for a two-stage approach as compared to a one-stage approach, as performed by resampling module 236). Deformulation tool 345 then performs a statistical operation on the matching samples (e.g., as performed by statistical aggregation module 237), and post-processes 350 the resulting vector to obtain final deformulation ingredient amounts (e.g., as performed by post-processing module 238.

Figure 4:
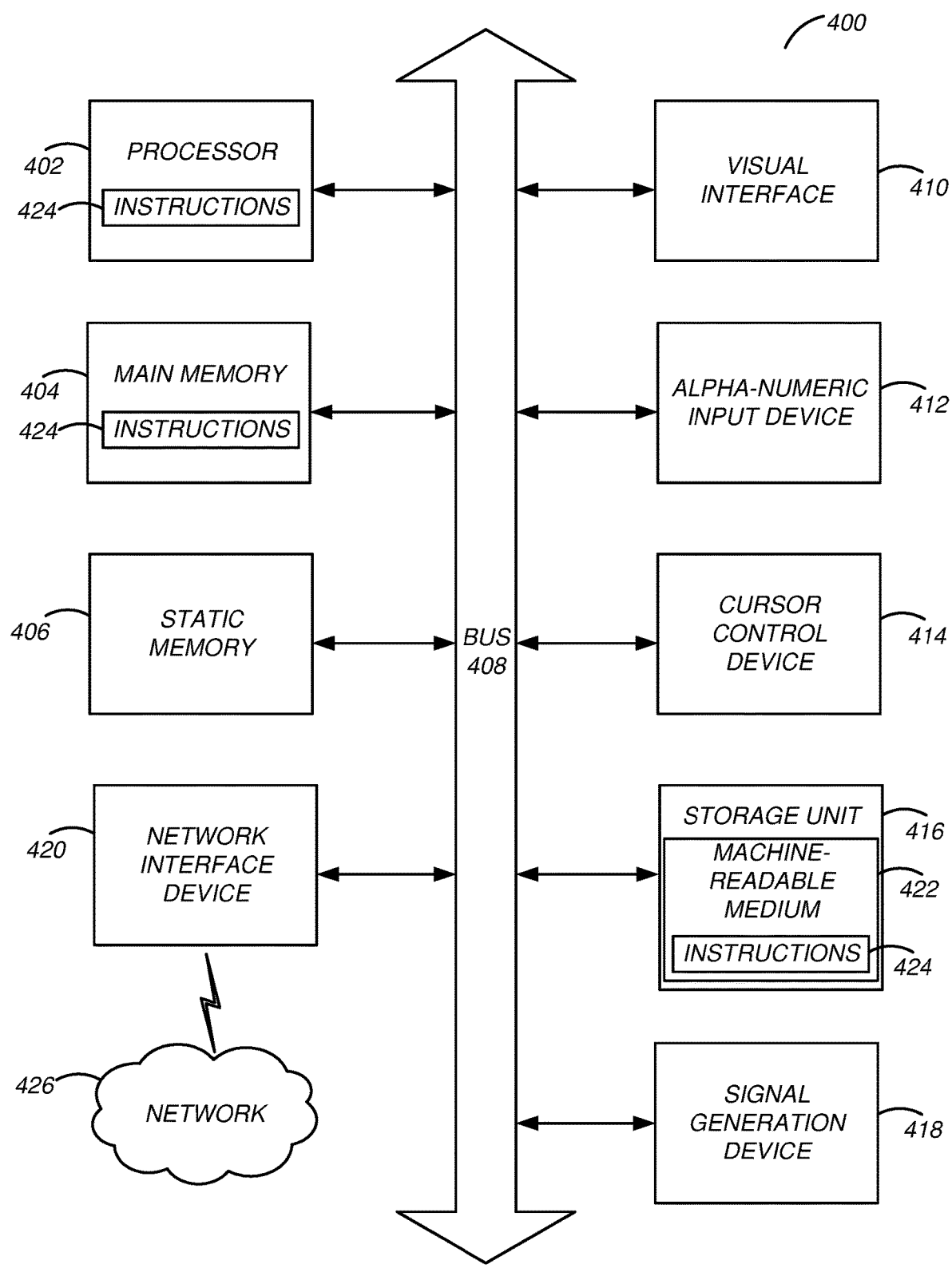
FIG. 4 is a block diagram illustrating components of an example machine able to read instructions from a machine-readable medium and execute them in a processor (or controller).

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Figure 5:
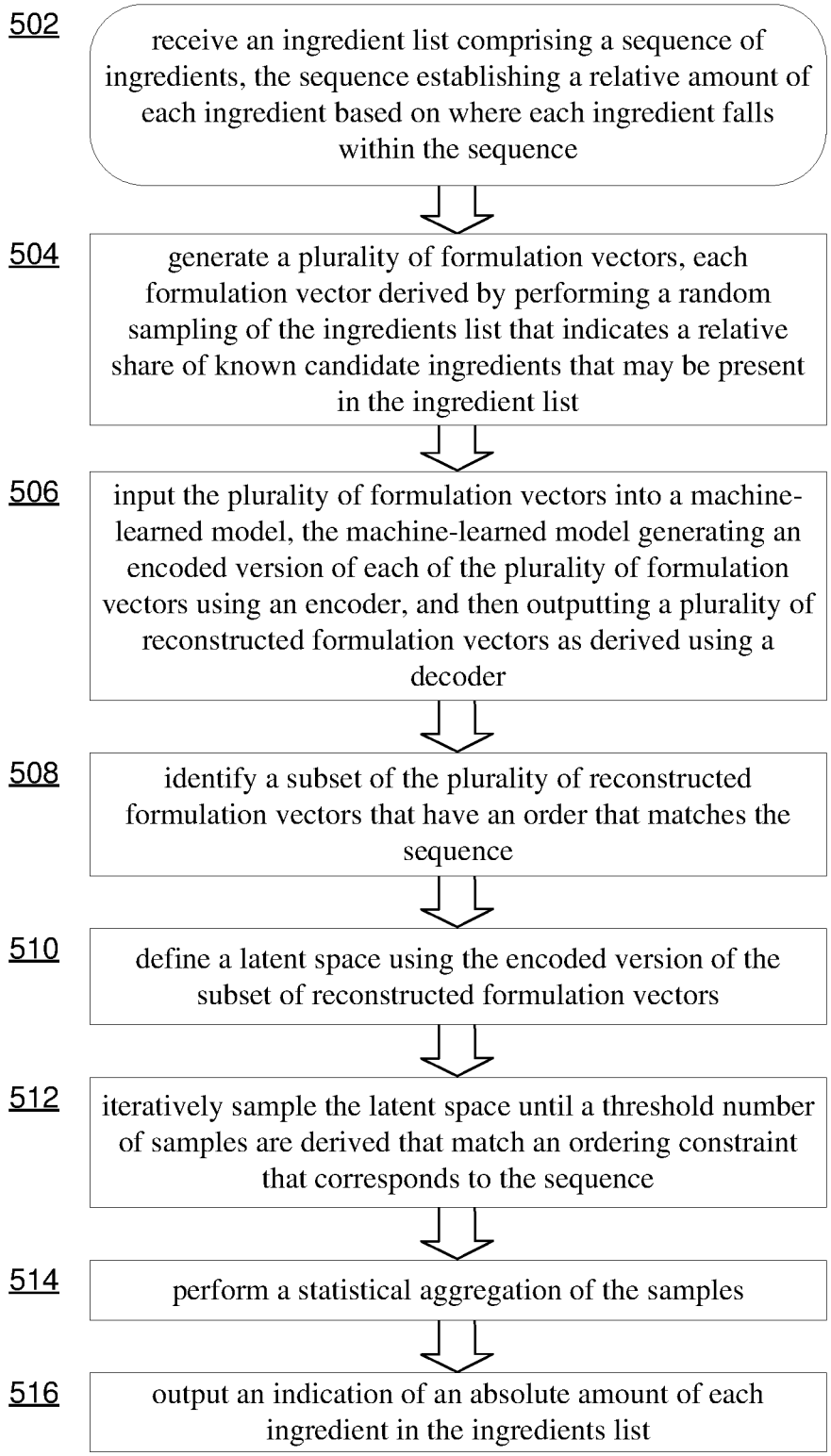
FIG. 5 is an exemplary flowchart of a process for deformulating a recipe.

FIG. 5 is an exemplary flowchart of a process for deformulating a recipe. The elements of process 500 may be performed by processor 402 executing instructions 424. The elements of process 500 are merely exemplary and may be performed in any order or include fewer or additional elements in accordance with the other description within this disclosure. Process 500 begins with deformulation tool 130 receiving 502 an ingredient list comprising a sequence of ingredients (e.g., using ingredient list processing module 232), the sequence establishing a relative amount of each ingredient based on where each ingredient falls within the sequence. Deformulation tool 130 may then generate 504 a plurality of formulation vectors (e.g., using sampling module 233), each formulation vector derived by performing a random sampling of the ingredients list that indicates a relative share of known candidate ingredients that may be present in the ingredient list.

Deformulation tool 130 may then input 506 the plurality of formulation vectors into a machine-learned model (e.g., a VAE from model database 241), the machine-learned model generating an encoded version of each of the plurality of formulation vectors using an encoder, and then outputting a plurality of reconstructed formulation vectors as derived using a decoder (e.g., based on training performed by VAE training module 231). Deformulation tool 130 identify 508 a subset of the plurality of reconstructed formulation vectors that have an order that matches the sequence (e.g., using recipe matching module 234), and may define 510 a latent space using the encoded version of the subset of reconstructed formulation vectors (e.g., using subspace determination module 235).

Deformulation tool 130 may iteratively sample 512 the latent space until a threshold number of samples are derived that match an ordering constraint that corresponds to the sequence (e.g., using VAE resampling module 236). Responsive to the threshold being met, deformulation tool 130 may perform 514 a statistical aggregation of the samples (e.g., using statistical aggregation module 237), and may output 516 an indication of an absolute amount of each ingredient in the ingredients list (e.g., using a user interface, as described further below with respect to FIG. 6).

Figure 6:
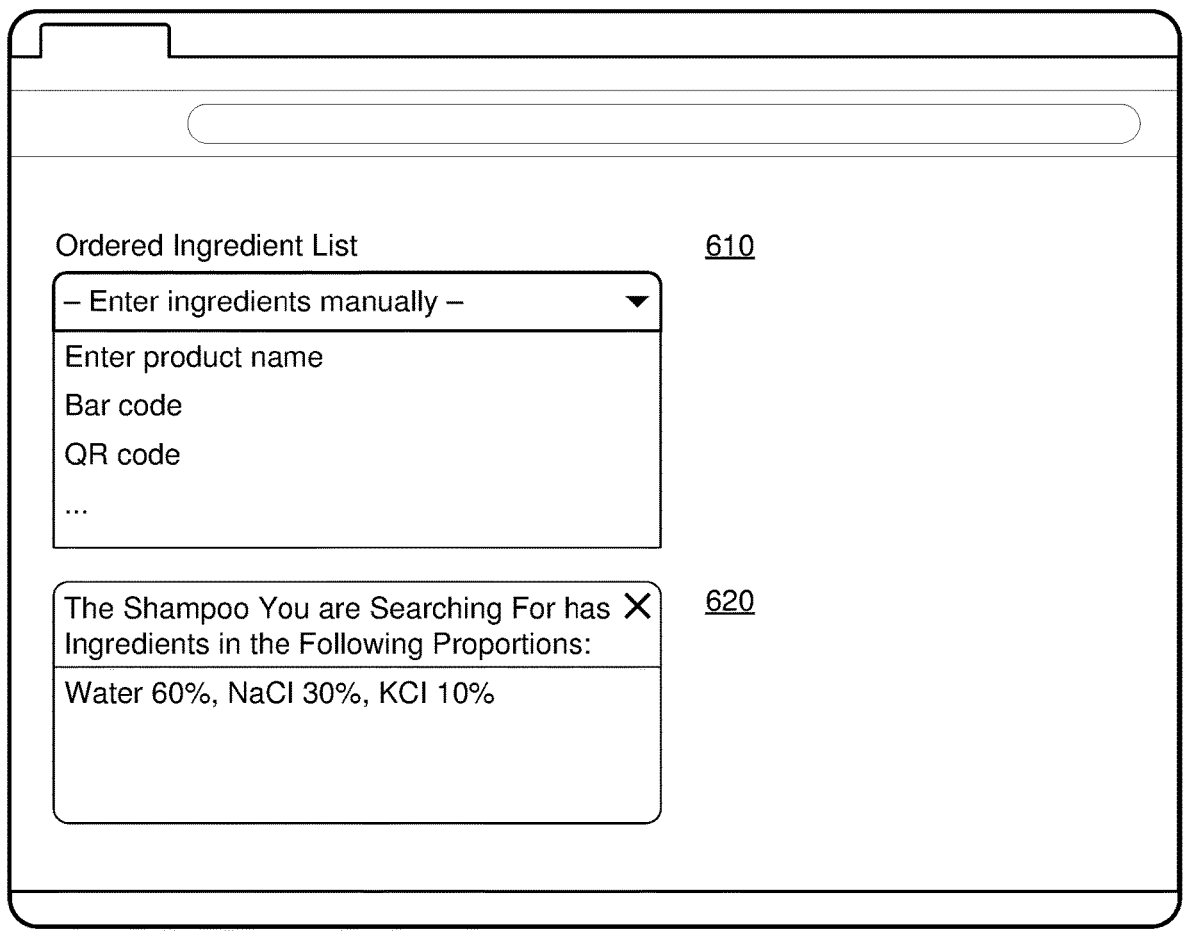
FIG. 6 depicts an exemplary user interface for inputting a recipe and receiving a deformulated recipe as an output on the basis of a machine learning deformulation.

FIG. 6 depicts an exemplary user interface for inputting a recipe and receiving a deformulated recipe as an output on the basis of a machine learning deformulation. User interface 600 may be displayed on client device 110, and includes input option 610 and output option 620. Input option 610 is depicted as a drop-down menu enabling options for inputting an ordered ingredients list. Exemplary options include typing in (or speaking) the ingredients list manually, entering a product name (by which a search for ingredients will be performed), scanning a bar code, and scanning a QR code. Other options for obtaining the ingredients list are within the scope of this disclosure (e.g., capturing an image of the ingredients list, and resolving the ingredients named therein using optical character recognition). After the ingredients list is obtained (e.g., either via manual input or a search), output option 620 populates the proportions of the ingredients list as determined by deformulation tool 130.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for using machine learning to generate a capability map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving an ingredient list comprising a sequence of ingredients, the sequence establishing a relative amount of each ingredient based on where each ingredient falls within the sequence;
generating a plurality of formulation vectors, each formulation vector derived by performing a random sampling of the ingredients list that indicates a relative share of known candidate ingredients that may be present in the ingredient list;
inputting the plurality of formulation vectors into a machine-learned model, the machine-learned model generating an encoded version of each of the plurality of formulation vectors using an encoder, and then outputting a plurality of reconstructed formulation vectors as derived using a decoder;
identifying a subset of the plurality of reconstructed formulation vectors that have an order that matches the sequence;
defining a latent space using the encoded version of the subset of reconstructed formulation vectors;
iteratively sampling the latent space until a threshold number of samples are derived that match an ordering constraint that corresponds to the sequence, wherein the threshold number of samples is a first threshold number of samples smaller than a second threshold number of samples;
responsive to determining that the first threshold is satisfied:
defining a constrained latent space using encoded versions of respective ones of the plurality of formulation vectors that matched the ordering constraint corresponding to the first threshold number of samples, the constrained latent space being a narrow subset of the latent space; and
iteratively sampling the constrained latent space until a second number of samples that satisfy the second threshold are derived that match a second ordering constraint that corresponds to the sequence;
performing a statistical aggregation on the samples of the second number of samples; and
outputting an indication of an absolute amount of each ingredient in the ingredients list based on the statistical aggregation.

2. The method of claim 1, wherein the sequence begins with an ingredient having a highest relative amount and ends with an ingredient having a lowest relative amount.

3. The method of claim 1, wherein the machine-learned model is a variational autoencoder (VAE).

4. The method of claim 3, wherein the VAE is trained using training data comprising formulation recipes that are labeled based on a resulting composition, the formulation recipes specifying an amount of each ingredient that is present in each given formulation recipe.

5. The method of claim 3, wherein the encoder outputs a plurality of latent space vectors, wherein the decoder takes the plurality of latent space vectors as input and outputs the plurality of reconstructed formulation vectors based on a processing of the plurality of latent space vectors.

6. The method of claim 1, wherein the ordering constraint is initialized as requiring a reconstructed formulation vector to have ingredients having relative amounts in an order that matches the sequence, and wherein iteratively sampling the latent space comprises:
determining whether a number of reconstructed formulation vectors that satisfy the ordering constraint meets the first threshold number of samples; and
responsive to determining that the number of reconstructed formulations that satisfy the ordering constraint does not meet the first threshold number of samples, relaxing the ordering constraint.

7. The method of claim 6, wherein relaxing the ordering constraint comprises ignoring a smallest ingredient, and wherein further relaxing the ordering constraint on further iterations comprises ignoring a next smallest ingredient.

8. A non-transitory computer-readable medium comprising memory with instructions encoded thereon, the instructions, when executed by one or more processors, causing the one or more processors to perform operations, the instructions comprising instructions to:
receive an ingredient list comprising a sequence of ingredients, the sequence establishing a relative amount of each ingredient based on where each ingredient falls within the sequence;
generate a plurality of formulation vectors, each formulation vector derived by performing a random sampling of the ingredients list that indicates a relative share of known candidate ingredients that may be present in the ingredient list;
input the plurality of formulation vectors into a machine-learned model, the machine-learned model generating an encoded version of each of the plurality of formulation vectors using an encoder, and then outputting a plurality of reconstructed formulation vectors as derived using a decoder;

identify a subset of the plurality of reconstructed formulation vectors that have an order that matches the sequence;

define a latent space using the encoded version of the subset of reconstructed formulation vectors;

iteratively sample the latent space until a threshold number of samples are derived that match an ordering constraint that corresponds to the sequence, wherein the threshold number of samples is a first threshold number of samples smaller than a second threshold number of samples;

responsive to determining that the first threshold is satisfied:

define a constrained latent space using encoded versions of respective ones of the plurality of formulation vectors that matched the ordering constraint corresponding to the first threshold number of samples, the constrained latent space being a narrow subset of the latent space; and iteratively sample the constrained latent space until a second number of samples that satisfy the second threshold are derived that match a second ordering constraint that corresponds to the sequence;

perform a statistical aggregation on the samples of the second number of samples; and output an indication of an absolute amount of each ingredient in the ingredients list based on the statistical aggregation.

9. The non-transitory computer-readable medium of claim 8, wherein the sequence begins with an ingredient having a highest relative amount and ends with an ingredient having a lowest relative amount.

10. The non-transitory computer-readable medium of claim 8, wherein the machine-learned model is a variational autoencoder (VAE).

11. The non-transitory computer-readable medium of claim 10, wherein the VAE is trained using training data comprising formulation recipes that are labeled based on a resulting composition, the formulation recipes specifying an amount of each ingredient that is present in each given formulation recipe.

12. The non-transitory computer-readable medium of claim 10, wherein the encoder outputs a plurality of latent space vectors, wherein the decoder takes the plurality of latent space vectors as input and outputs the plurality of reconstructed formulation vectors based on a processing of the plurality of latent space vectors.

13. The non-transitory computer-readable medium of claim 8, wherein the ordering constraint is initialized as requiring a reconstructed formulation vector to have ingredients having relative amounts in an order that matches the sequence, and wherein the instructions to iteratively sample the latent space comprise instructions to:

determine whether a number of reconstructed formulation vectors that satisfy the ordering constraint meets the first threshold number of samples; and responsive to determining that the number of reconstructed formulations that satisfy the ordering constraint does not meet the first threshold number of samples, relax the ordering constraint.

14. The non-transitory computer-readable medium of claim 13, wherein the instructions to relax the ordering constraint comprise instructions to ignore a smallest ingredient, and wherein the instructions further comprise instructions to further relax the ordering constraint on further iterations by ignoring a next smallest ingredient.

15. A system comprising:

memory with instructions encoded thereon; and one or more processors that, when executing the instructions, are caused to perform operations comprising:

receiving an ingredient list comprising a sequence of ingredients, the sequence establishing a relative amount of each ingredient based on where each ingredient falls within the sequence;

generating a plurality of formulation vectors, each formulation vector derived by performing a random sampling of the ingredients list that indicates a relative share of known candidate ingredients that may be present in the ingredient list;

inputting the plurality of formulation vectors into a machine-learned model, the machine-learned model generating an encoded version of each of the plurality of formulation vectors using an encoder, and then outputting a plurality of reconstructed formulation vectors as derived using a decoder;

identifying a subset of the plurality of reconstructed formulation vectors that have an order that matches the sequence;

defining a latent space using the encoded version of the subset of reconstructed formulation vectors;

iteratively sampling the latent space until a threshold number of samples are derived that match an ordering constraint that corresponds to the sequence, wherein the threshold number of samples is a first threshold number of samples smaller than a second threshold number of samples;

responsive to determining that the first threshold is satisfied:

defining a constrained latent space using encoded versions of respective ones of the plurality of formulation vectors that matched the ordering constraint corresponding to the first threshold number of samples, the constrained latent space being a narrow subset of the latent space; and iteratively sampling the constrained latent space until a second number of samples that satisfy the second threshold are derived that match a second ordering constraint that corresponds to the sequence;

performing a statistical aggregation on the samples of the second number of samples; and outputting an indication of an absolute amount of each ingredient in the ingredients list based on the statistical aggregation.

16. The system of claim 15, wherein the sequence begins with an ingredient having a highest relative amount and ends with an ingredient having a lowest relative amount.

17. The system of claim 15, wherein the machine-learned model is a variational autoencoder (VAE).

18. The system of claim 17, wherein the VAE is trained using training data comprising formulation recipes that are labeled based on a resulting composition, the formulation recipes specifying an amount of each ingredient that is present in each given formulation recipe.

* * * * *